United States Patent Office 2,906,540
Patented Sept. 29, 1959

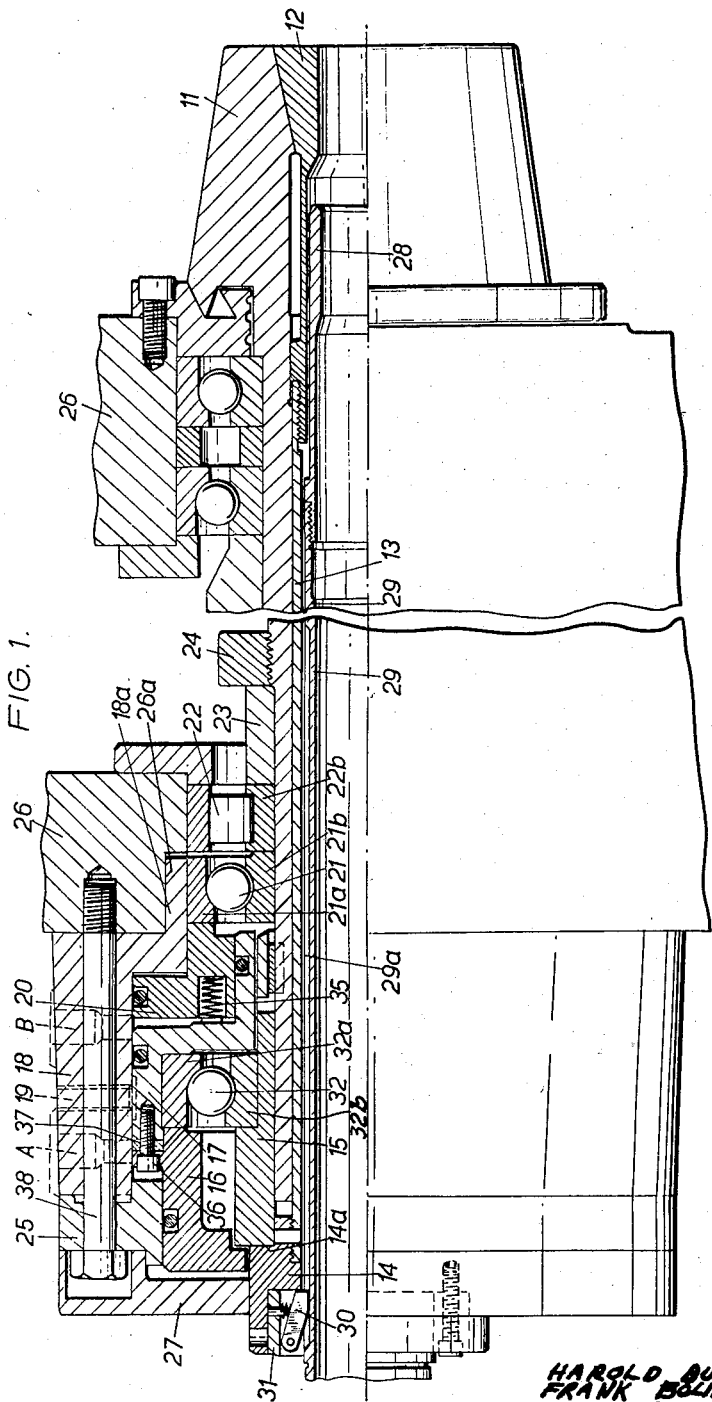

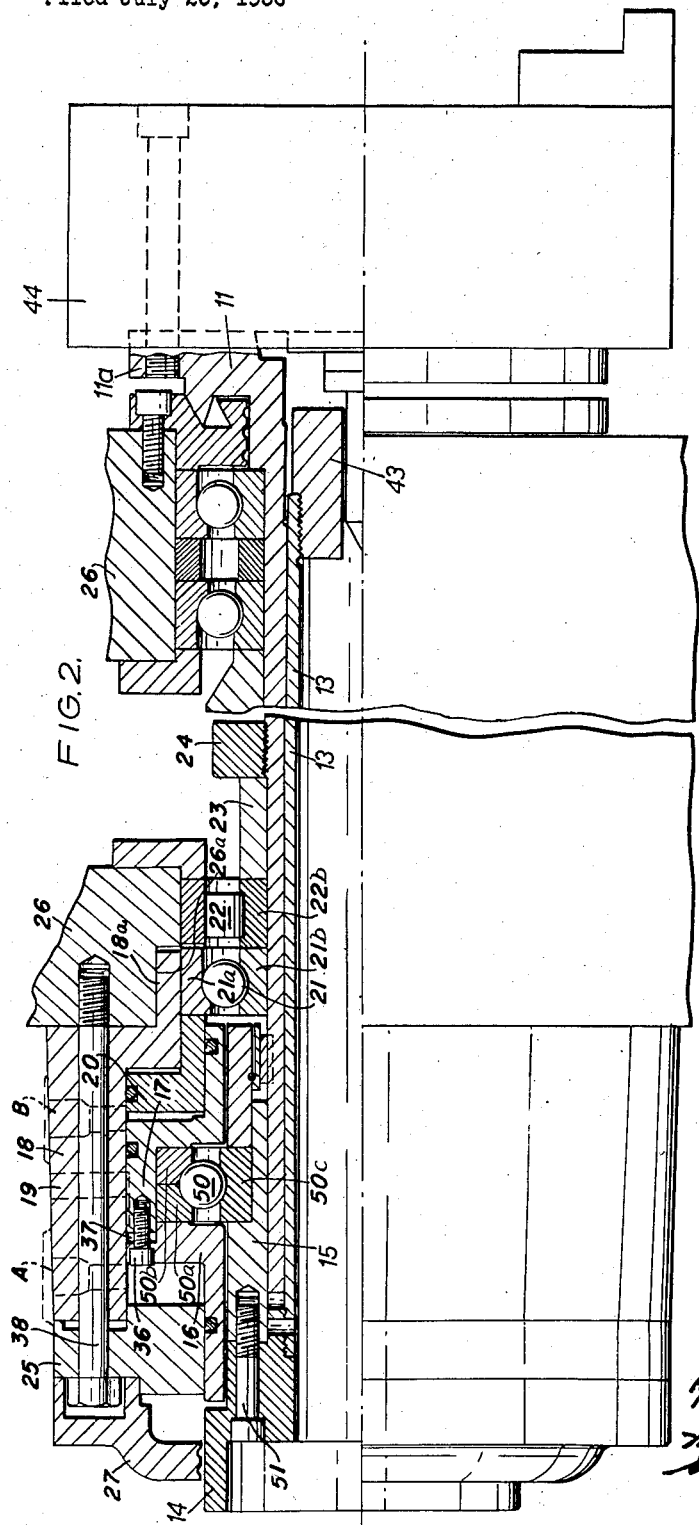

2,906,540

HYDRAULICALLY OPERATED CHUCKS

Harold Butterworth and Frank Bolingbroke, Rochdale, England, assignors to Butterworth British Automatic Machine Tool Co. Ltd., Rochdale, England, a British company Application July 25, 1956, Serial No. 600,064

Claims priority, application Great Britain July 27, 1955

2 Claims. (Cl. 279—4)

The present invention concerns hydraulically operated chucks for machine tools; and is especially concerned with collet and jaw chucks, and with chucking fixtures, for lathes.

An object of the present invention is to provide a hydraulically operated chuck of simple mechanical construction without recourse to rotating hydraulic connections.

According to the present invention, in a machine tool having a hydraulically operated chuck, a piston coaxial with a rotary spindle is displaceable axially of the spindle within a stationary hydraulic cylinder mounted independently of said spindle and is arranged to transmit axial displacement relative to said spindle to a chuck operating member rotatable with said spindle by way of an antifriction axial thrust transmitting bearing. The bearing is preferably of an angular contact type and may be a ball bearing.

The piston is preferably engaged on the outer race of an angular contact ball antifriction bearing the inner race of which is engaged with a sleeve mounted on the spindle so as to rotate therewith but relatively displaceable axially thereof. This sleeve may act by way of an intermediate member such as a thimble connected to the chuck operating member, which latter may be constituted by a draw tube disposed within the spindle.

The piston is conveniently made in two parts adapted to be bolted or otherwise rigidly connected together so as to provide means for positive connection of the outer race to the piston.

Where a self releasing chuck, for instance of the spring collet type, is used hydraulically effected displacement is only required in one direction and the axial thrust transmitting bearing may be of a type capable of transmitting thrust in this axial direction only. On the other hand where a hydraulically effected displacement is required also for releasing, for instance as with a jaw chuck, the axial thrust bearing must be of an appropriate design and the inner race thereof must be positively secured to the displaceable sleeve.

Means are preferably provided for relieving axial thrust on the chuck end of the spindle, resulting from the hydraulically applied force continuously transmitted to the chuck whilst a workpiece is being gripped, since such thrust would otherwise have to be accepted by the main headstock bearings of the spindle. One convenient arrangement includes a slightly displaceable thrust plate, acting as a floating head in the fixed hydraulic cylinder, and which receives an equal and opposite hydraulic reaction corresponding to the force acting on the piston. This reactive pressure may then be transmitted to the spindle by way of a second axial thrust bearing so as to neutralise or counterbalance the aforementioned axial chuck-operating thrust therein.

The invention will now be described further by way of example with reference to the accompanying drawings in which:

Fig. 1 is a part-sectional side elevation of part of a machine tool having a collet type chuck at one end of a spindle and an operating mechanism at the other end;

Fig. 2 is a similar view of part of a machine tool having a jaw chuck at one end of the spindle and the operating mechanism at the other end.

Like reference numerals are employed in both Figures of the drawings to denote like parts. For simplicity of description and to aid in the proper understanding of the invention, the drawings show only those parts of a machine tool which are essential to an explanation of the invention, and structural elements of a conventional nature such as will be readily comprehended by those skilled in the art have been omitted.

In Fig. 1 of the drawings, a spindle 11, mounted on antifriction bearings, has at its front end region, a tapered bore in which is housed a complementarily shaped interchangeable collet 12. The collet 12 is screwed in the forward end of a draw tube 13, which in turn is screwed and pegged in a draw thimble 14 at its rear end. A shoulder 14a of the draw thimble 14 provides an abutment for a sleeve 15 which is engaged on the spindle 11 so as to be rotationally restricted relative to the spindle 11 but axially free to slide along it. An angular contact antifriction ball bearing 32, for the end thrust and journal load, having an outer race 32a and an inner race 32b is engaged on the sleeve 15; the outer race 32a of this bearing is mounted in a two part piston 16, 17 a clearance being left between the outer surface of the race 32a and the piston part 17. The two parts of the piston 16, 17 are secured together by a series of bolts 36, a sealing ring 37 being interposed between the co-operating surfaces of the two parts.

The piston 16, 17 is mounted in a cylinder 18 so as to be axially free but rotationally restricted therein by means of a key 19. A thrust plate 20 is mounted in the cylinder 18 so that its foremost part abuts against the outer race 21a of an angular contact antifriction ball bearing 21; the inner race 21b of this bearing is mounted on the spindle 11. A roller bearing 22 for carrying the main radial load of the spindle 11 is mounted adjacent the ball bearing 21. The bearing 21 is adapted to take only the end thrust from the thrust plate 20, so that the force on the piston 16, 17 is not transmitted to the main spindle bearings; the end thrust acts through the bearing 21, the inner race 21b thereof, the inner race 22b of adjacent roller bearing 22, a spacing sleeve 23 to a nut 24 locked to spindle 11.

The open rear end of the cylinder 18 is closed by means of an end plate 25, through which pass a series of bolts 38 arranged to secure the cylinder to the headstock 26 of the machine independently of the spindle 11; the cylinder 18 is spaced concentrically around the spindle 11 by means of a spigot 18a engaging within a bore 26a in the headstock 26. An end plate 27 serves no structural purpose other than to act as a dust cover.

A feed finger 28 is mounted inside the collet 12 and screwed into the forward end of a feed tube 29. A spring loaded key 30, disposed in a keyway 29a milled in the rear part of the feed tube 29, maintains the correct angular relationship between the feed finger 28 and the collet 12. The key 30 is pivoted inside a slot in a feed thimble 31 secured by means of a screw to the draw thimble 14.

When a component such as a bar is being machined, conventional means (not shown) are provided for retracting feed finger 28 and the feed tube 29 from the collet 12, the spring grip of the feed finger 28 being light enough to allow it to slide over the bar whilst it is gripped in the collet 12. On completion of the machining cycle, oil is fed under pressure through a port A in the wall of the cylinder 18 whilst a port B in said wall is opened to exhaust; the piston 16, 17 moves forwardly whilst carrying the bearing 32 and hence the sleeve 15 with it. Since the sleeve 15 then no longer abuts the draw thimble 14, the collet 12, which, due to its own resistance, acts on the tapered bore of the spindle 11, draws itself forwardly (i.e. to the right in Fig. 1) carrying therewith the draw tube 13 and draw thimble 14 and, at the same time, releasing its grip on the bar.

The feed finger 28 together with the feed tube 29 is then moved forwardly by conventional means (not shown), the light grip of the feed finger being sufficient to feed the bar forwardly up to a predetermined stop. The stop having been reached, a valve (not shown) opens port B to pressure and port A to exhaust whereby the piston 16, 17, is moved rearwardly, carrying with it the bearing 32 and sleeve 15. The sleeve 15 then comes in abutment with the draw thimble 14, and the draw tube 13 and the collet 12, on continued movement of the piston 16, 17 are then retracted until the co-operating surfaces of the collet and the tapered bore of spindle 11 interact to close the collet and exert a grip on the bar. The magnitude of this gripping force is controlled by a valve (not shown) in the hydraulic circuit and assisted mechanically by a series of springs 35 acting on the thrust plate 20. A separate non-return valve (not shown) is also included in the hydraulic circuit to port B to enable that port to be closed, whereby previously established hydraulic pressure on the chuck may be maintained whilst the hydraulic pump is stationary for long periods of time; springs 35 would alternatively enable the chuck to maintain a relatively light grip on the bar indefinitely.

While the chuck is held in the closed position, the reaction of the hydraulic pressure on the piston 16, 17 is taken by the thrust plate 20 and from thence through the bearing 21, the inner race 22b of the bearing 22, the sleeve 23 and the nut 24 to the spindle 11; the reaction is opposed by the force set up in the nose of the spindle so that the closing force of the chuck is not taken by the main spindle bearings.

In the alternative embodiment shown in Fig. 2 the spindle 11 has a flange 11a to which is bolted a jaw chuck 44, or a fixture such as a hood formed with a tapered bore to house interchangeable collets shaped similarly to those shown in Fig. 1. The purpose of this alternative embodiment is to provide a device which can be readily adapted for use with various types of chucks.

The main constructional features of the chuck closing mechanism shown in this alternative embodiment are similar to those shown in Fig. 1. A two-part piston 16, 17 is mounted to be slidably displaceable in a cylinder 18, but rotarily restricted therein by means of a key 19. The cylinder 18 is fixedly secured to the headstock 26 of the machine tool by means of bolts 38, the said bolts at the same time serving to engage against the rear end of cylinder 18, an end plate 25 by means of which said rear end of the cylinder is closed. The piston parts 16 and 17 are secured together by means of screws 36, and between said piston parts is clamped the two-part outer race 50a, 50b of an angular contact, anti-friction bearing 50. The inner race 50c of the bearing 50 has secured thereto, a sleeve 15 which is arranged to be slidable along but rotarily fixed relative to the spindle 11, and this sleeve 15 in turn carries, by means of screws 51, a draw thimble 14 threadedly connected to a draw tube 13 arranged within the spindle 11. The draw tube 13, at its forward end, is threadedly engaged with an adapter 43, and the adapter 43 is connected in any conventional manner with the conventional draw sleeve of the chuck 14.

As in the embodiment of the invention which has been described with reference to Fig. 1, the cylinder 18 is provided with ports A and B for the admission of hydraulic medium, and the forward end of cylinder 18 is closed by means of a thrust plate 20 which has a portion abutting a bearing 21.

In the operation of this embodiment of the invention, admission of hydraulic medium through the port B will cause the piston 16, 17 to be displaced rearwardly (i.e. to the left as shown in the drawing), and hence the bearing 50 is also moved to the left. The inner race 50c of the bearing 50 displaces the sleeve 15 in the same direction, and hence results in similar displacement of the draw thimble 14 and draw tube 13 connected thereto. The adapter 43 carried at the forward end of the draw tube 13 is thus displaced to the left, and this displacement is transmitted to the chuck jaws by the chuck draw sleeve connected to the adapter 43. The chuck is thus closed, the machining of a component in the chuck may be carried out. On the completion of such machining, the port B is opened to exhaust and hydraulic medium is admitted to the port A, whereby the piston 16, 17 is displaced forwardly (i.e. to the right in the drawing), with consequent corresponding displacement of the bearing 50, sleeve 15, draw thimble 14, draw tube 13 and adapter 43. Since the sleeve 15 is positively engaged with the race 50c of the bearing 50, and since the draw thimble 14 is positively connected to the sleeve 15, this embodiment of the invention enables a positive opening force to be applied to the chuck. With this in mind, it will be noted that the piston part 16 in this embodiment is shaped to provide a substantial rear surface area on which hydraulic medium can act. It wil lalso be observed that, as compared with the embodiment of Fig. 1, the piston has a longer stroke to allow for a greater degree of opening of the chuck, whereby to facilitate easy insertion of a workpiece component in the chuck.

The thrust plate 20 in the embodiment of Fig. 2 acts in precisely the same manner as the corresponding thrust plate in Fig. 1. Thus, when hydraulic medium is admitted to the port B and the piston 16, 17 is displaced rearwardly, the reaction of the hydraulic medium is taken by the thrust plate 20 and transmitted by that plate to the outer race 21a of the bearing 21. From there, said reaction is transmitted by the inner race 21b of bearing 21, the inner race 22b of adjacent bearing 22, and sleeve 23 to the stop 24 on spindle 11. This thrust reaction then serves to counterbalance the closing force exerted on the chuck by the adapter 43, and which is transmitted to the spindle 11 by the chuck itself.

The feed finger, feed tube, feed thimble and key of the previously described construction of Fig. 1 are omitted with a chuck of the type shown in Fig. 2 as their use is unnecessary.

If the shape of the component being machined is such that a hollow spindle would not be necessary, a solid draw bolt can be used instead of the draw tube 13; in this case the end of the chuck draw bolt is threaded to take the draw sleeve, the adapter 43 not being required.

We claim:

1. A hydraulic chuck operating mechanism for a machine tool of the type wherein a hydraulically operated chuck is carried at the forward end of a hollow rotary spindle journalled in a headstock and a chuck operating member extends through and is rotatable with said spindle, said mechanism comprising an annular cylinder rigidly mounted at one end to said headstock and disposed concentrically about said spindle, a thrust-plate slidably disposed about said spindle at said end of and within said cylinder, the peripheral edges of said thrust-plate being in sealing contact with the inner wall of said cylinder and closing said cylinder end and forming a hydraulic medium-receiving chamber therewith, a piston disposed completely within said cylinder and reciprocable relative to said spindle, said cylinder being provided with a port on each side of said piston to permit the admission and exhaust of a hydraulic medium for effecting longitudinal reciprocable movement of said piston relative to said spindle, one of said ports being located between one side of said piston and one surface of said thrust-plate and communicating with said hydraulic medium-receiving chamber, a sleeve mounted on said spindle and slidable relative thereto, an axial thrust transmitting bearing comprising an outer race, an inner race and bearing elements rolling between said races, said outer race secured to said piston and said inner race secured to said sleeve, and means connecting said chuck operating member to said sleeve to operate said member in response to sliding movement of said sleeve relative to said spindle.

2. A hydraulic chuck operating mechanism for a machine tool of the type wherein a hydraulically operated chuck is carried at the forward end of a hollow rotary spindle journalled in a headstock and a chuck operating member extends through and is rotatable with said spindle, said mechanism consisting of an annular cylinder rigidly mounted at one end to said headstock and disposed concentrically about said spindle, a thrust-plate slidably disposed about said spindle at said end of and within said cylinder, the peripheral edges of said thrust-plate being in sealing contact with the inner wall of said cylinder and closing said cylinder end and forming a hydraulic medium-receiving chamber therewith, a piston disposed completely within said cylinder and reciprocable relative to said spindle, said cylinder being provided with a port on each side of said piston to permit the admission and exhaust of a hydraulic medium for effecting longitudinal reciprocable movement of said piston relative to said spindle, one of said ports being located between one side of said piston and one surface of said thrust-plate and communicating with said hydraulic medium-receiving chamber, a sleeve mounted on said spindle and slidable relative thereto, an axial thrust transmitting bearing comprising an outer race, an inner race and bearing elements rolling between said races, said outer race secured to said piston and said inner race secured to said sleeve, means connecting said chuck operating member to said sleeve to operate said member in response to sliding movement of said sleeve relative to said spindle, a second axial thrust transmitting bearing adjacent the opposite, parallel surface of said thrust-plate, said second bearing having an inner race mounted on said spindle, and said thrust-plate having a portion abutting the outer race of said second bearing, and stop means on said spindle for receiving from said second bearing a hydraulic reaction transmitted thereto by said thrust-plate to counterbalance the force exerted on said spindle by the chuck when in closing position.

References Cited in the file of this patent

UNITED STATES PATENTS

| | | |
|---|---|---|
| 2,546,326 | Wetzel | Mar. 27, 1951 |

FOREIGN PATENTS

| | | |
|---|---|---|
| 560,561 | Great Britain | Apr. 7, 1944 |
| 1,011,257 | France | Apr. 2, 1952 |